(12) United States Patent
Pellet et al.

(10) Patent No.: US 10,538,015 B2
(45) Date of Patent: Jan. 21, 2020

(54) STRANDS POWDERED BY ELECTROSTATIC METHOD

(71) Applicant: PORCHER INDUSTRIES, Badinieres (FR)

(72) Inventors: Romain Pellet, Villeurbanne (FR); Grégory Merle, Cessieu (FR)

(73) Assignee: PORCHER INDUSTRIES, Badinieres (FR)

( * ) Notice: Subject to any disclaimer, the term of this patent is extended or adjusted under 35 U.S.C. 154(b) by 0 days.

(21) Appl. No.: 15/521,473

(22) PCT Filed: Oct. 26, 2015

(86) PCT No.: PCT/EP2015/074734
§ 371 (c)(1),
(2) Date: Apr. 24, 2017

(87) PCT Pub. No.: WO2016/062896
PCT Pub. Date: Apr. 28, 2016

(65) Prior Publication Data
US 2017/0334094 A1    Nov. 23, 2017

(30) Foreign Application Priority Data

Oct. 24, 2014    (FR) ..................................... 14 60259

(51) Int. Cl.
*B29B 15/12* (2006.01)
*B29C 43/24* (2006.01)
(Continued)

(52) U.S. Cl.
CPC .......... *B29B 15/125* (2013.01); *B29C 43/245* (2013.01); *B29C 43/58* (2013.01); *B29C 2043/5825* (2013.01); *B29K 2307/04* (2013.01)

(58) Field of Classification Search
CPC ............ B29B 15/12; B29C 2043/5825; B29C 43/245; B29C 43/58; B29C 70/086;
(Continued)

(56) References Cited

U.S. PATENT DOCUMENTS 4,284,679 A    8/1981    Blad et al.
4,900,499 A    2/1990    Mills
(Continued)

FOREIGN PATENT DOCUMENTS

CA    2 312 467    9/1996
CN    10 2615839    8/2012
(Continued)

OTHER PUBLICATIONS

International Search Report dated Jan. 13, 2016 in International Application No. PCT/EP2015/074734.
(Continued)

*Primary Examiner* — Camie S Thompson
(74) *Attorney, Agent, or Firm* — B. Aaron Schulman, Esq.; Stites & Harbison, PLLC (57) ABSTRACT

The invention relates to a method and facility for manufacturing a tape of reinforcement filaments impregnated by a polymer matrix, said tape having a constant width across the entire length thereof, wherein the filaments extend in a direction parallel to the length of the tape, from a strand of filaments coming from a feeding reel, the method including steps and units that make it possible to manage the unwinding tension of the strand, to guide the strand on the axis of the machine, to manage the width of the strand, to deposit the polymer on the strand by electrostatic powdering, with a polymer weight ratio of around 20% to around 75% to melt the polymer, to calibrate the width and thickness of the tape and to collect the tape on the storage reel.

24 Claims, 5 Drawing Sheets

(51) Int. Cl.
*B29C 43/58* (2006.01)
*B29K 307/04* (2006.01)

(58) Field of Classification Search
CPC ....... B29C 70/14; B29C 70/20; B29C 70/506;
B29C 70/545; B29K 2307/04; B29K
2105/0854; B29K 2105/251; B32B 5/12;
B32B 5/26; B32B 2250/03; B32B
2250/20; B32B 2250/44; B32B
2262/0253; B32B 2262/0261; B32B
2262/0276; B32B 2262/0284; B32B
2262/0292; B32B 2262/10; B32B
2262/101; B32B 2262/14; B32B
2262/105; B32B 2262/106; Y10T 428/23;
Y10T 428/237; Y10T 428/249942
USPC ................... 428/293.7, 298.1, 74; 427/327
See application file for complete search history.

(56) References Cited

U.S. PATENT DOCUMENTS

| | | |
|---|---|---|
| 5,019,427 A | 5/1991 | Soules |
| 5,057,338 A | 10/1991 | Baucom et al. |
| 5,171,630 A | 12/1992 | Muzzy et al. |
| 5,302,419 A | 4/1994 | Muzzy |
| 5,362,431 A | 11/1994 | Guerrini et al. |
| 5,364,657 A | 11/1994 | Throne |
| 5,409,757 A | 4/1995 | Muzzy et al. |
| 5,432,010 A | 7/1995 | Ko et al. |
| 5,560,922 A | 10/1996 | Chien et al. |
| 5,658,510 A | 8/1997 | Carraro et al. |
| 5,756,206 A | 5/1998 | Davies et al. |
| 5,911,932 A | 6/1999 | Dyksterhouse |
| 5,977,244 A | 11/1999 | Kohlhammer et al. |
| 6,096,669 A | 8/2000 | Colegrove et al. |
| 6,139,942 A | 10/2000 | Hartness et al. |
| 6,372,294 B1 | 4/2002 | Vodermayer et al. |
| 6,503,856 B1 | 1/2003 | Broadway et al. |
| 6,511,561 B1 | 1/2003 | Kohlhammer et al. |
| 6,524,690 B1 | 2/2003 | Dyksterhouse |
| 6,565,944 B1 | 5/2003 | Hartness et al. |
| 6,585,842 B1 | 7/2003 | Bompard et al. |
| 6,656,316 B1 | 12/2003 | Dyksterhouse |
| 6,709,995 B1 | 3/2004 | Dyksterhouse |
| 6,919,118 B2 | 7/2005 | Bompard et al. |
| 7,045,203 B2 | 5/2006 | Christou |
| 7,297,740 B2 | 11/2007 | Dyksterhouse |
| 7,648,733 B2 | 1/2010 | Adzima et al. |
| 7,803,438 B2 | 9/2010 | Flather et al. |
| 7,858,172 B2 | 12/2010 | Imaizumi et al. |
| 7,959,758 B2 | 6/2011 | Flather et al. |
| 7,998,565 B2 | 8/2011 | Mitsuhashi et al. |
| 8,043,669 B2 | 10/2011 | Ohno |
| 8,062,448 B2 | 11/2011 | Bompard et al. |
| 8,367,168 B2 | 2/2013 | Flather et al. |
| 8,840,988 B2 | 9/2014 | Wohlmann et al. |
| 9,205,603 B2 | 12/2015 | Beraud et al. |
| 9,259,859 B2 | 2/2016 | Blackburn et al. |
| 9,393,758 B2 | 7/2016 | Ponsolle et al. |
| 9,508,471 B2 | 11/2016 | Beraud et al. |
| 9,682,515 B2 | 6/2017 | Beraud et al. |
| 9,922,757 B2 | 3/2018 | Beraud et al. |
| 9,931,810 B2 | 4/2018 | Beraud et al. |
| 10,000,662 B2 | 6/2018 | Hochstetter et al. |
| 2003/0148082 A1 | 8/2003 | Bompard et al. |
| 2003/0166764 A1 | 9/2003 | Dyksterhouse |
| 2004/0219855 A1 | 11/2004 | Tsotsis |
| 2005/0048280 A1 | 3/2005 | Stamper et al. |
| 2005/0205213 A1 | 9/2005 | Bompard et al. |
| 2006/0068140 A1 | 3/2006 | Flather et al. |
| 2008/0020193 A1 | 1/2008 | Jang et al. |
| 2008/0223505 A1 | 9/2008 | Bompard et al. |
| 2011/0003158 A1 | 1/2011 | Flather et al. |
| 2011/0129608 A1 | 6/2011 | Adzima et al. |
| 2011/0203027 A1 | 8/2011 | Flather et al. |
| 2012/0015135 A1* | 1/2012 | Beraud ................ B29C 70/086 428/74 |
| 2012/0043006 A1 | 2/2012 | Noll |
| 2012/0308817 A1 | 12/2012 | Ponsolle et al. |
| 2013/0244018 A1 | 9/2013 | Wohlmann et al. |
| 2013/0248087 A1 | 9/2013 | Gaillard et al. |
| 2014/0322511 A1 | 10/2014 | Beraud et al. |
| 2014/0377556 A1 | 12/2014 | Boursier |
| 2015/0004368 A1 | 1/2015 | Witzke et al. |
| 2015/0322622 A1 | 11/2015 | Gaillard et al. |
| 2015/0343747 A1 | 12/2015 | Meermann et al. |
| 2015/0375461 A1 | 12/2015 | Blackburn et al. |
| 2016/0052229 A1 | 2/2016 | Beraud et al. |
| 2016/0303842 A1 | 10/2016 | Ponsolle et al. |
| 2017/0165875 A1 | 6/2017 | Gaillard et al. |
| 2017/0232704 A1 | 8/2017 | Beraud et al. |

FOREIGN PATENT DOCUMENTS

| | | |
|---|---|---|
| CN | 0102950780 | 3/2013 |
| CN | 10 397 86 96 | 8/2014 |
| CN | 10 3963319 | 8/2014 |
| CN | 10 4058777 | 9/2014 |
| CN | 10 4924487 | 9/2015 |
| CN | 10 5061995 | 11/2015 |
| CN | 10 5885072 | 8/2016 |
| DE | 10 2006 057603 | 6/2008 |
| EP | 1321282 | 6/2003 |
| FR | 2939069 * | 6/2010 |
| JP | H09136976 | 5/1997 |
| JP | 2004027078 | 1/2004 |
| JP | 2004090352 | 3/2004 |
| JP | 2012056232 | 3/2012 |
| JP | 2012167252 | 9/2012 |
| KR | 2013 0085163 | 7/2013 |
| WO | WO-9215404 | 9/1992 |
| WO | WO 02/06027 | 1/2002 |
| WO | WO-0206027 | 1/2002 |
| WO | WO 2006/034830 | 4/2006 |
| WO | WO 2008/127556 | 10/2008 |
| WO | WO 2015/039845 | 3/2015 |

OTHER PUBLICATIONS

Excerpts from Schwarts 2005, cited as an "A" reference in the Russian equivalent application. The excerpted pages contain common information about processing of reinforced polymers.

* cited by examiner

STRANDS POWDERED BY ELECTROSTATIC METHOD

The present invention relates to the technical field of composites with a continuous reinforcement with a thermoplastic or thermosetting organic matrix. It more particularly relates to semi-finished products used in the manufacturing of composite materials by automated fiber placement (AFP) or by filamentary winding, pultrusion, braiding, 3D printing. These composites are intended for "indirect" methods, which means that the whole organic matrix of the final composite is already found on the semi-finished product. Once the tape is deposited and carried out on the support, a perform is obtained which contains a certain percentage of porosity according to the deposition parameters. Finally, depending on the porosity level aimed in the final part and on the quality of the preform, the step for consolidating the part is carried out in an autoclave or in an oven.

In the aeronautical, oil or automotive fields, it becomes imperative to automate the manufacturing methods in order to gain in productivity, in accuracy and therefore in quality in order to remain competitive in these highly competitive sectors. Moreover, these sectors require high quality products with generally high mechanical properties. The use of carbon fiber and notably of unidirectional fibers gives the possibility of meeting the requirements. However, the primordial parameter for these applications, once the requirements have been met, is the quality. Indeed, in aeronautics, all the structural parts are controlled at the different manufacturing steps, the cost of non-qualities may then be very significant. Moreover, the price of high performance materials used, like carbon and the polymers with a high Tg, requires having a very low waste level in order to be competitive. Finally, for reducing the machine idle times, the conditioning of the semi-finished products should be optimized, this notably requires the use of coils of great lengths not containing any defects to be discarded during the deposition. It is in order to meet these requirements that the semi-finished products according to the invention have been developed.

This type of product is generally obtained in several steps which may be carried out separately or on line. The first step consists of obtaining a unidirectional carbon web formed with several strands of carbon. Once the filaments are aligned and the surface mass of carbon is adjusted, the web is immersed into a polymeric dispersion in a liquid phase, this is the impregnation phase. Once the filaments are loaded with polymer, the web is heated in order to melt this polymer and to discharge the liquid phase. Finally, once the web is consolidated, it is cut out as a tape with a controlled width, and then wound on coils. The major drawbacks of this method is that the cutting out causes filaments to jut out from the edges of the tape and that, if the cutting out is not perfectly parallel to the filaments, the latter are not strictly oriented in the longitudinal direction of the tape.

EP 1 007 309 describes the production of continuous tapes by impregnation of thread strands in an inorganic material, of the carbon or glass type, in a bath of polymer with application of shearing. This method aims at producing tape for the indirect method, with a polymer level ranging from 25 to 75% by weight. Example 1 describes the passage of a strand of glass threads in an impregnation bath, and then into a die of rectangular section with dimensions 0.64 cm×0.023 cm, for producing a tape having these dimensions. Therefore this is an impregnation method via a molten route for which the production rate is limited (a rate attaining 1,676 cm/min is mentioned), wherein the impregnation directly depends on the viscosity of the polymer and which does not allow working with every types of polymers. Further, this method does not give the possibility of having coils with a great length (greater than 100 m) without making a «splice», which generates discontinuities in the reinforcement and therefore potentially a reduction of the mechanical properties. Other drawbacks are the energy cost for removing the water or the solvent and the ecological impact in the case of using a solvent.

An object of the invention is to produce and propose a reinforcement tape with a great length in a single piece, without any cutting out and without any splices, which may attain the length of the strand (tow) of the supply coil, for example which may attain and exceed 1,000 meters, while having a very regular width which may be characterized by a very small standard deviation and/or good management of the distribution of the polymer.

Another object of the invention is to produce and propose such a tape with a controlled polymer level.

Another object of the invention is to produce and propose such a tape for which the constitutive filaments are strictly parallel to the longitudinal direction of the tape.

An object of the invention is therefore to propose a method giving the possibility of continuously manufacturing such a tape.

Another object of the invention is to produce and propose such a tape which is flexible, notably for which the flexibility may easily be adjusted, and preferably which is non-brittle.

A further other object of the invention is to produce and propose such a tape at a competitive price.

These objects are attained with a method for producing continuously a tape from a strand of filaments. The object of the present invention is a method for manufacturing a tape of reinforcement filaments, impregnated with a thermoplastic or thermosetting polymer matrix, a tape which has a constant width over the whole of its length, wherein the filaments extend along a direction parallel to the length of the tape. This method may be applied to the treatment of a strand from a supply coil or simultaneously and in parallel of several (2 or more) strands stemming from as many supply coils. The supply coils may notably be of a type currently used, most commonly a crossed coil (the strand is wound with transverse and crossed winding) or optionally a coil with simple transverse winding.

This method is notably characterized in that it comprises, for each strand (one or several strands may be treated simultaneously), the following manufacturing steps, from a supply coil with a strand up to a coil for storing the tape:

a) handling the tension between the supply coil and the storage coil,
b) guiding the strand so as to orient a strand moving in translation on a line coinciding with a longitudinal axis, a so called machine axis, extending as far as the proximity of the storage coil,
c) optionally a transverse spreading of the strand to a predetermined width greater than the width of the tape,
d) handling the width of the strand,
e) optionally traction of the strand, preferably by pinching or padding,
f) grounding the strand,
g) deposition of the polymer as a powder on the strand, by electrostatic powder coating, preferably with a mass polymer content of about 20% to about 75%, obtaining an impregnated tape,
h) melting or softening the polymer,
i) width and thickness calibration of the tape, j) optionally measurement of the width and/or of the thickness of the tape, k) winding the tape on the storage coil.

According to the invention, a strand is defined as consisting of an assembly of filaments (or fibers) and includes from about 1,000 to about 80,000 filaments, preferably between 3,000 and about 24,000 filaments. The strands used within the scope of the invention preferably are in a material selected from among carbon, ceramics, glasses, silicas, basalts, and aramides, or further any other material used in the field of composite materials, for example metal filaments or fibers, the filaments may be of natural or synthetic origin. Carbon is particularly preferred. The ceramics which may be used are notably silicon carbide and refractory oxides, for example, alumina and zirconia. The initial strand may appear as an already flattened shape or more or less round. Generally, the strands are shown in crossed wound flat strand coils. In a preferred embodiment, carbon strands are used comprising from about 1,000 to about 80,000 filaments, preferably from about 3,000 and about 24,000 filaments.

The flat composite formed with the strand and with the thermoplastic or thermosetting polymer is called a tape. At the end of the manufacturing, this tape is advantageously stored on a coil or a support which may be directly used on the deposition automata (robot). The winding may be of the wire-to-wire type (the tape is wound edge-to-edge, this method is preferred) or of the crossed type.

The filaments forming the strand or the tape are preferably continuous filaments. The filaments used generally have a substantially circular cross-section (round filaments) or, preferably substantially parallelepipedal or elliptical sections (flat filaments). The strands have irregular widths, as described in the table below, giving the width of the carbon strands according to the number of filaments and to their titer.

| Number of filaments | Titer (tex) | Width variation of a strand |
| --- | --- | --- |
| 3K | 200 | 1 to 3 mm |
| 12K | 445 | 2 to 5 mm |
| | 800 | 3 to 7 mm |
| 24K | 1000 | 5 to 10 mm |
| | 1600 | 5 to 12 mm |

Any type of carbon thread may be used. Preferably, High Resistance (HR) threads may be used, for which the tensile modulus is comprised between 220 and 241 GPa and for which the stress at breakage in traction is comprised between 2,450 and 4,830 MPa, Intermediate Modulus (IM) threads for which the tensile modulus is comprised between 242 and 300 GPa for which the stress at breakage in traction is comprised between 3,450 and 6,400 MPa and High Modulus (HM) threads for which the tensile modulus is comprised between 345 and 600 GPa and for which the stress at breakage in traction is comprised between 3,450 and 5,520 MPa (see ASM Handbook, ISBN 0-87170-703-9, ASM International 2001).

In a), it is stated that the tension is handled or adjusted between both coils, which means that the strand and the tape which results continuously are maintained under tension between the supply coil and the storage coil. The tension all along the line end of the method may vary according to the steps and devices the strand, and then the tape are passing through. This tension may notably be comprised and vary between about 5 and about 50 N. The guiding of the strand in step b) allows its accurate alignment in the machine axis. The guiding step may notably suppress the transverse winding of the strand and/or remove the side movements related to the unwinding of a crossed wound strand on the supply coil. The guiding may notably use at least one set of at least two bars oriented so as to be able to bring back the strand stemming from the supply coil, onto a perfectly aligned line or trajectory on the machine axis (the positioning in the axis includes the positioning at a determined height, which is that of the machine axis), at least until cooling of the impregnated tape. For example, a set of two bars at 90° may be used. The first bar is parallel to the axis of the coil, oriented at 90° relatively to the direction of running of the strand, the latter sliding from left to right on the first bar because of the transverse winding of the supply coil. This first bar gives the possibility of adjusting the alignment of the strand in the remainder of the method. It also gives the possibility of forcing the strand to flatten, notably, but not only, in the case of a round initial strand. Then, the strand passes in contact with the second bar located below the first, oriented at 90° relatively to the previous one and perpendicularly to the machine axis, and which gives the possibility of keeping the strand flat and adjusting the height of the strand for the continuation of the method.

According to a first embodiment, the strand originally has a width constantly greater than the width of the final tape.

According to a second embodiment, the width of the strand is constantly or occasionally (one/off) equal, close or lower than the width of the final tape. In this case the spreading of the strand in step c) is provided. The strand returned into the machine axis is spread out transversely. The transverse spreading of the strand is accomplished at a width greater than the rated width of the tape. This step guarantees that the strand, gradually as it is subject to this step, always has a width greater than the rated width of the final tape. To do this, the strand may notably pass into a spreading device, comprising one or several bar elements, such as spreading bars, which give the possibility of spreading the strand so that its width is always greater than the rated width of the final tape. It is notably possible to use bars having a diameter comprised between about 10 mm and about 100 mm. Preferably, the bars have a not very abrasive surface, for example chromium, aluminium or ceramic. In order to obtain the desired width, it is possible to heat the bars and/or have them vibrate, which enhances the spreading.

In d) the width of the strand is handled or adjusted, which means that the width of the strand is reduced to a predetermined value by passing it in a calibration device. In the case of the strand spread out in c), the width is reduced to a predetermined value, notably comprised between the maximum spreading out width and the rated width of the final tape. In order to carry out this handling of width, it is notably possible to have the strand pass into a groove which calibrates the strand to the desired width. Notably, the width after spreading is of about 1.5 to about 4.5, for example from about 2 to about 3 times the rated width of the final tape. For example, the calibration width is from about 10 mm to about 29 mm for a rating of the tape of about 6.35 mm.

Downstream from this step, at a moment of its path, wherein the strand is under a strong tension (there may be a tension ranging up to 5 kg per strand), it is preferable in step e) to pull the strand in order to maintain its width and to apply to the strand a movement for advancing towards the storage coil. This step may notably be accomplished by means of a device giving the possibility of pinching the strand and of forcing it to move in the direction opposite to the supply coil. It is notably possible to use a foulard or a similar device.

The work produced on this strand up to now gives the possibility of working with initial strands of very different qualities, for example having a variable width, of guaranteeing a regular powder level and of significantly improving the dispersion of width of the final tape.

A step for measuring the width may be accomplished with a laser, as this will be described later on.

The running rate of the strand and of the tape may be notably comprised between about 5 and about 50 m/min, notably between about 10 and about 40 m/min, typically between about 15 and about 35 m/min. This speed is adapted to the different steps, in particular the powder coating step.

The grounding f) of the strand, in order to allow electrostatic powder coating, is advantageously achieved as close as possible to the powder coating, therefore just upstream from this step.

The powder coating step g) determines the distribution of the matrix in the final tape as well as the fiber/matrix level in the final composite product. Preferably, an electrostatic powdering method is used. The strand is grounded, notably by passing into contact with one or several bars which are grounded, for example one or several spreading bars.

This powdering step comprises a first dry fluidization step. Fluidization consists of having a gas pass between polymeric particles of a small size. When the friction of the gas generates a sufficient force for compensating the weight of all the particles of the bed, it is stated that the particle bed is fluidized. The use of the dry fluidized bed gives the possibility of depositing larger amounts of powder and of working with more powder as compared with pressure pots.

One or several guns or nozzles for electrostatic powder coating are preferably used, using the corona discharge principle. This consists of applying a high potential difference between the tip of the gun and the part to be covered, which is connected to the ground. The electric field at the tip accelerates the electrons of the surrounding medium by Coulomb's force and ionizes the molecules present in the air. By an avalanche effect, a self-sustained method is obtained which makes the surrounding medium conductive. The powder particles crossing this ionized medium become charged by accumulation of electrons at their surface. They are then driven by the electric field towards the strand which is connected to the ground. For the strands of non-conductive filaments, the surface is made to be conductive before powder coating by nebulization, metallization or the use of a conductive polymer.

Within the scope of this invention, the deposition of the powder is accomplished via the use of one or two gun(s) on which a nozzle, preferably a flat nozzle, is mounted. This type of facility gives the possibility of generating a powder cloud around the strand which is itself connected to ground. The powder which is located around the fiber is then attracted by the strand modifying its trajectory for generating a thin layer of deposit all around the strand. Preferably, a gun is positioned above the strand, the other one underneath.

The control of the guns is accomplished via a central unit which allows independent control of both guns. The parameters which may be adjusted are:

Injection pressure: it gives the possibility of bringing the powder of the fluidized bed to the gun Dilution pressure: additional pressure which gives the possibility of diluting the powder in the pipe which leads to the gun.

Tension and intensity: both of these parameters give the possibility of controlling the tension and the intensity dissipated at the cathode.

The adjustment of these parameters gives the possibility of adjusting the powder level deposited on the fiber and the regularity of the deposit. The adjustments are to be adapted for each strand/matrix pair.

Possibly, the carbon tape is divided into several filament bundles during the powder coating. The use of this option makes it preferable that a first powder coating pass is achieved vertically or in the vicinity of the strand separated into bundles, and that a second powder coating pass is achieved a little further on, at a location of the line where the tape is again joined up (the contiguous bundles then having tendency of moving closer to each other in order to tend towards the tape structure such as it was before the separation into bundles, except that some polymer was deposited for which one portion may separate, more or less distinctly, the contiguous bundles), in order to guarantee the cladding of the strand. The number of bundles and how to obtain them are tackled later on. More details on this embodiment are given in Example 4.

Once the powder is deposited on the thread, this is then referred to as a tape, which therefore consists of a fibrous reinforcement oriented in the longitudinal direction impregnated with a polymeric matrix. The length of a tape coil may be equal or substantially equal to the coil from which the thread stems, without any length limit on the thread.

The mass polymeric matrix level applied on the spread out strand may notably be comprised between about 20, 25 or 30% and about 75%, notably between about 20, 25 or 30% and about 50% and more particularly between about 30% and about 40%. This particularly high level gives the possibility of using the tape in the indirect method. This level may attain significant values, greater than 30 or 40%, while being flexible and well consolidated, as this will be seen later on.

At the stage of the impregnation of the strand, the polymer which impregnates the fiber is in the form of a powder for which the grains have a diameter notably comprised between about 10 μm and about 300 μm and preferentially between about 30 μm and about 200 μm.

The method may be applied to any type of fluidizable powder having a softening point allowing adhesion to the strand during the powder coating. From among these powders mention may more particularly be made of the following thermoplastic and thermosetting polymers: polyamides (notably PA6, PA12, PAU, PA6.6, PA 6.10, PA 6.12), co-polyamides (CoPA), polyamides-block ether or ester (PEBAX, PEBA), polyphthalamides (PPA), polyesters (notably polyethylene terephthalate-PET-, polybutylene terephthalate-PBT-), the co-polyesters (CoPE), the thermoplastic polyurethanes (TPU), the polyacetals (POM, . . . ), polyolefins (notably PP, HDPE, LDPE, LLDPE), polyethersulfones (PES), polysulfones (PSU, . . . ), polyphenylene sulfones (PPSU, . . . ), polyetheretherketones (PEEK), polyetherketoneketone (PEKK), poly(phenylene sulfide) (PPS), polyetherimides (PEI), thermoplastic polyimides, liquid crystal polymers (LCP), phenoxys, block copolymers such as styrene-butadiene-methylmethacrylate copolymers (SBM), butyl-methylmethacrylate methylmethacrylate-acrylate copolymers (MAM) and mixtures thereof, epoxys, bismaleimide, phenolic polymers.

According to a characteristic of the invention, the thermoplastic material is a thermoplastic material. Firstly, this may be a high performance thermoplastic material i.e. having a melting point or a transformation temperature greater than or equal to 280° C. It may notably be selected from PEEK, PPS, PEKK, PEI, or a mixture of at least two of them.

The invention is compatible with the use of thermosetting polymers as a powder having a softening temperature less than their cross-linking temperature. This type of powder is obtained by formulation of a non-cross-linked thermosetting polymer and gives the possibility of obtaining a tape with a non-cross-linked thermosetting polymer level comprised between 20, 25 or 30% and 75%. This tape may then be used in an automated fiber-placement method or filamentary winding method, where the cross-linking will be activated once the cross-linking temperature is reached. This tape impregnated with thermosetting polymer gives the possibility of making composite parts without any injection or infusion step after placement of the tape and also allows storage for a limited time at room temperature.

In step h), the melting or softening of the powder may notably be carried out by passing in one or several, notably 2, ovens, preferably short or medium infrared ovens, just after the powdering step. The regulation of the oven(s) is accomplished preferably in power for a better stability of the method. There again, the adjustments are to be adapted for each strand/matrix pair but also depending on the running rate and the targeted powder level. The temperature applied to the polymer is in every case greater than its melting point (e.g. for semi-crystalline polymers) or sufficient for having the powdery polymer pass to the viscous state allowing the impregnation. For PEEK, the temperature may notably be comprised between 300 and 450° C., more particularly between 350 and 450° C.

The calibration of the tape in step i) to a target width is a determining characteristic since, for example, the width variations cause non-qualities at the moment of the automated deposition of the tape by the deposition automator for forming. A too small width generates «gaps» while a too large width generates «overlaps» and jamming at the deposition head.

In order to obtain a low width dispersion, it is necessary to have a perfect thread alignment before calendering, which is ensured all along the method and at the calibration stage. Thus it is possible to provide, upstream from the melting, an alignment of the tape in order to have it coincide with the machine axis and in particular with the calibration device located downstream. It is thus possible to use one or several bars, notably oblique bars.

Preferably, in step i), the tape may be calendered. This calendering may give the possibility of alignment on the machine axis or contribute to this. Especially, the calendering gives the possibility of ensuring the impregnation of the strand with the thermoplastic or thermosetting material, which is still found in the molten state. Preferably, the calender is cooled. The temperature of the material at this stage may allow it to become sufficiently fluid so as to be shaped. The calendering may be accomplished by having the tape pass between at least two cooled rollers for which it is possible to regulate the pressure and the temperature. In this device, the calendering gives the possibility of having the matrix penetrate more or less into the tape and also possibly spreading out the tape.

The impregnation level takes into account the distribution of the matrix in the transverse direction of the tape. A low impregnation level amounts to having, according to an embodiment, a hollow tape with a distribution of the polymer only at the periphery of the strand (e.g. in carbon), thereby forming a polymer sheath (or continuous layer) which protects the filaments and guarantees very great flexibility to the tape. In other words, one has a reduced proportion of filaments taken in the polymeric matrix. In this embodiment, the calendering pressure is preferably less than 1 bar, typically it is comprised between about 0.1 and about 0.9 bars, notably between about 0.1 and about 0.6 bars. This type of product is of particular interest for the draping of complex shapes with very small radii of curvature.

On the contrary, a high impregnation level will correspond, according to another embodiment, to a tape wherein the polymer is distributed in a substantially uniform way between the filaments (e.g. of carbon) in the direction of the width and of the thickness. In this case, the polymer protects the filaments of the tape by a sheath, but then it does not necessarily form a continuous outer layer like in the previous case. However one has a high proportion of filaments taken in the polymeric matrix. In this embodiment, the calendering pressure is preferably greater than or equal to 1 bar, typically it is comprised between about 1 and about 4 bars. By increasing the impregnation level, the sliding of the filaments against each other is prevented, which reduces the flexibility of the latter.

According to the invention, the temperature parameter may be continuously tracked by the measurement of temperature, for example by means of an infrared pyrometer, at the outlet of the oven and/or before the calendering.

The calendering ensures a first calibration, notably in the thickness of the tape.

Step i) may comprise a calibration in width of the tape by passing in a transverse calibration device or in width, or calibration both in width and in thickness. Preferably, step i) comprises on the one hand, the calendering and on the other hand the calibration in width, or in width and in thickness.

Preferably, calibration is made both in the transverse direction and in thickness. It is notably possible to calibrate by means of at least two antagonistic forms of calibration, notably antagonistic grooves. The calibration is advantageously adjusted to the desired rated width for the tape. Different embodiments will be described later on.

The cooling is carried out gradually between the outlet of the oven and the coil. It is not indispensable to provide a cooling device. It was seen that the calendering at the end of the calibration i) is carried out at a sufficient temperature, e.g. comprised between the glassy transition temperature and the melting point of the semi-crystalline polymer. Before the coil, the temperature reached is such that the polymer is no longer deformable, for example it is less than the glassy transition temperature Tg of the semi-crystalline polymer.

The width and/or the thickness of the tape may be measured in j) continuously, preferably with its standard deviation, during the manufacturing of the tape by using the following method. Downstream from its calibration and upstream from its storage on a coil, one/off measurements of width and/or of thickness are carried out every x cm (for example every 50 cm or every 1 meter) by means of a Laser, the data are processed by a computer processing unit or a computer collecting the values of widths and calculating the standard deviation. Advantageously a laser is used formed with an emitter emitting a laser light line and a receiver including a line of receiving cells. The emitter is placed on one side of the tape, facing one of its planar faces if the width is measured. The receiver is placed on the other side of the tape, facing its other planar face always for the measurement of width. The shadow of the tape projected on the receiver gives the possibility of determining the width (or the thickness) with great accuracy.

The coil in step k) consists of winding the tape on supports preferably compatible with automated deposition automator. It may be carried out in two different ways: in tension or in velocity. For the winding in tension, the pin bearing the storage coil adapts its speed of rotation depending on the tension information of the tape, for example rewound by a dancer arm. This type of coil gives the possibility of having a very clean coil and does not require any subordination of velocity with the device, such as the foulard, which pulls the tape at the beginning of the line. In the case of a fast winding, the speed of the pin is entered as a set value, the winding device has to be servocontrolled and the driving device such as the foulard in order to avoid any problem of tension due to the difference in speed between both apparatuses. A tensioned coil is preferred.

The coil and therefore the speed for producing the tape may be comprised between about 5 and about 50 m/min, notably between about 10 and about 40 m/min, typically between about 15 and about 35 m/min.

The method described in the invention gives the possibility of making a tape just from a single strand and from several strands (2 or more).

In an embodiment, the surface mass of carbon is increased. For this, at least two, preferably two, carbon tapes are superposed in order to obtain a given surface mass. For example, two carbon tapes of 12K 800 tex calibrated to 6.35 mm are superposed in order to obtain a surface mass of 2×126=252 g/m². The association of both threads may be accomplished before powdering at the spreading or after powdering, once the polymer has melted. In both cases, it is necessary to reproduce the unwinding and guiding elements described earlier. Next, in the first case, the mixture of the filaments of both threads is accomplished all along the bar devices used for spreading the threads. The continuation of the line is not modified, only the adjustment of the electrostatic powdering and the power of the ovens have to be adjusted. In the case when the assembling is carried out after powdering, the guiding of both powdered threads has to be adapted before calibration, the remainder of the line remaining unchanged.

Another object of the invention is the tape which may be produced by the method of the invention. According to the invention, a continuous reinforcement tape is produced formed with unidirectional filaments of an inorganic material, substantially uniformly coated and/or substantially impregnated to the core with a thermoplastic or thermosetting polymer at a mass level comprised between about 20, 25 or 30% and about 75%, notably between about 20, 25 or 30% and about 50% and more particularly between about 30% and about 40%. The tape is of a predetermined and controlled constant width with preferably a standard deviation comprised between 0.02 and 0.15 mm, preferably between 0.02 and 0.05 (limits included), on a length of a single piece (without any splice) greater than or equal to 100, 500, 1,000 or 5,000 m, or even more. This standard deviation exists in reality over the whole length of tape produced from a continuous supply strand length. From a coil with x meters of strand, a tape with a length substantially equal to the width and compliant standard deviation is produced. This standard deviation is typically measured as described above by a Laser measurement. The tape is moreover continuous over the whole of its length, without cutting any filament and in a single piece, i.e. without any splice. Its constitutive filaments are substantially parallel to the longitudinal direction of the tape (or perfectly aligned in the longitudinal direction). This product is intended for indirect methods for producing composite parts, from one or several strands. The tape has a constant width, which may notably be comprised between about 2 mm and about 75 mm and more particularly between 5 mm and about 10 mm. The level of thermoplastic or thermosetting material may attain significant values, greater than 30 or 40%, while being flexible and well consolidated, as this will be seen later on. The standard deviation is calculated by using the following formula:

$$\sigma_x = \sqrt{\frac{1}{n}\sum_{i=1}^{n}(x_i - \bar{x})^2}$$

with n=number of measurements; $\bar{x}$=average value of x; $x_i$=value of x for n=i.

The width of the tape may be measured with its standard deviation continuously during the manufacturing of the tape by using the method described above, which gives the possibility of obtaining the standard deviation over the total length of the tape or on a fraction. Outside the production line, in order to characterize a tape according to the invention, it is possible to proceed in the same way, by unwinding the tape and by carrying out one/off measurements of width, for example every 1 m by the laser measurement.

The object of the invention is also a continuous tape impregnated and/or consolidated formed with unidirectional inorganic material filaments, preferably in carbon, uniformly coated and/or impregnated to the core with a thermoplastic or thermosetting polymer, comprising a polymer level comprised between about 20, 25 or 30% and about 75%, notably between about 20, 25 or 30% and about 50% by weight and preferably between about 30% and about 40% by weight, based on the weight of the tape. This tape may notably appear in three forms which will be described, i.e. hollow, impregnated and substantially consolidated to the core, impregnated and substantially consolidated to the core with bundles of filaments. The tape has a constant width, notably with a standard deviation comprised between 0.02 and 0.15 mm, preferably between 0.02 and 0.05 mm (limits included). The width of this tape may notably be comprised between about 2 mm and about 75 mm and more particularly between about 5 mm and about 10 mm. In an embodiment, the tape has an average width in the specification of 6.35 mm±0.15 mm with a standard deviation comprised between 0.02 and 0.05 mm, preferably over a length of one piece, that of the initial strand, notably grater than or equal to 100, 500, 1,000 or 5,000 m. Thus it is possible to have, for example a tape with an average width of 6.35 mm with a standard deviation comprised between 0.02 and 0.05 mm.

In a first embodiment, the tape is impregnated and consolidated at the periphery, including on its two longitudinal edges, the thermoplastic or thermosetting material impregnating the filaments at the periphery forming a substantially continuous sheath, including along the edges of the tape. Preferably, this tape has a particular surface condition, corresponding to the fact that it is covered in totality or in a major portion with molten or softened polymer which substantially forms a continuum of polymer from one end to the other of the tape in the direction of the width, and in the direction of the length, as illustrated as an example in FIG. 6. The average thickness of polymer at the surface (external layer) may advantageously be comprised between about 10 and about 100 µm, preferably between about 25 and about 100 µm. The tape comprises a certain proportion of non-impregnated filaments with polymer (taken in the polymer) at its inside. This proportion may notably represent about 20, 25 or 30 to about 50% of the total of the filaments of the tape (this may be determined by analyzing the impregnated and non-impregnated surfaces by image processing of sections with adequate magnification; the observation with a microscope or any other digital imaging device (still camera, video camera, etc.) gives the possibility of distinguishing the areas of naked fibers of the areas of impregnated fibers and taken in the polymer, as well as the polymer areas substantially or totally without any filaments)). This tape is said to be hollow, in so far that the core of the tape is formed with non-impregnated filaments, the core being consequently non-impregnated or non-consolidated.

In a second embodiment, the tape is impregnated and/or substantially consolidated to the core, i.e. it comprises a high proportion of filaments impregnated with polymer in its inside. This proportion may notably represent from about 80 to about 100% of the total of the filaments of the tape. Preferably, this tape has a particular surface condition, corresponding to the fact that it is covered partly with molten or softened polymer, forming discontinuous phases from one end to the other of the tape in the direction of its width and in the direction of its length, as illustrated as an example in FIG. 7. This tape is said to be impregnated to the core. According to an embodiment, the proportion of filaments taken in the polymer is comprised between 80% and 99, 98, 97, 96, 95 or 90%. Typical intervals are from 90 to 100%, notably from 95 to 100%. The average thickness of the polymer at the surface (external layer) may advantageously be comprised between about 10 and about 100 μm, preferably between about 25 and about 100 μm.

According to a particular embodiment of this impregnated tape and substantially impregnated to the core, the filaments are distributed as bundles. The filaments extend in the longitudinal direction of the tape as at least two bundles of filaments separated and covered by the polymer. The bundles are notably more or less individualized on the transverse plane. It will easily be understood that the number of bundles may be adapted according to the width of the tape. Typically 2 to 50, notably 5 to 50, preferably 10 to 30 bundles may be provided. The bundles are notably separated from each other by the polymer alone or containing optionally sparse filaments. The impregnated product may be characterized by a distribution of the filaments as bundles with a width comprised between about 200 μm and about 6,000 μm and a height comprised between about 50 μm and about 250 μm, the spacing of which is comprised between about 25 μm and about 100 μm. The fiber bundles are totally or partly impregnated with polymer in order to form a tape which has strong cohesion in the transverse direction to the fibers. Further, this product retains a thin sheath (external layer) of polymer. The average thickness of polymer at the surface may advantageously be comprised between about 10 and about 100 μm, preferably between about 25 and about 100 μm.

The measurement of the impregnation level may be conducted by image analysis (use of a microscope or still camera or digital camera, notably), of a cross-section of the tape, by dividing the surface of the tape impregnated with the polymer by the total surface area of the product (impregnated surface area+surface area of the porosities). In order to obtain an image of good quality, it is preferable to coat the cutout tape in its transverse direction in a standard polishing resin and to polish with a standard procedure allowing observation of the sample with a microscope with 6× magnification at least. As regards the impregnation levels, typically: a hollow product: of about 30% to about 70% and preferentially from about 40% to about 60%; impregnated product: from about 70% to about 100% and preferentially from about 90 to about 98%; impregnated product with a bundle structure: from about 70% to about 100% and preferentially from about 90 to about 100%.

The measurement of the thickness of the polymer sheath is carried out with the same tools, notably by means of a microscope from a cross-section of the tape (the preparation of the sample is identical with the one intended for the measurement of the impregnation level).

The flexibility of the tape may be characterized by a rigidimeter Taber Model 150D (Taber Industries, North Tonawanda, N.Y., USA) according to the NF ISO 2493-2 standard (Part 2: Taber Tester). All the measurements are carried out with the caliber no. 1, a so called extreme sensitivity caliber, the flexion angle used is 7.5° and the average of the reference platelet is 88.3 TSU (Taber Stiffness Unit) for a rated one of 88 TSU.

The Taber rigidity of the hollow tape with a mass of 250 TU (Taber Unit) is comprised between about 5 TSU and about 25 TSU and more specifically between about 10 TSU and about 20 TSU.

With this same device, the rigidity of the tape impregnated to the core is comprised between about 45 TSU and about 65 TSU and more specifically between about 50 TSU and about 60 TSU. The same measurement may be carried out with a mass of 500TU on the impregnated tape to the core, the Taber rigidity is then comprised between about 20 TSU and about 40 TSU and more specifically between about 25 TSU and about 35 TSU.

This is to be compared with the Taber rigidity of a tape obtained by standard impregnation (impregnation bath), which is typically comprised between about 65 TSU and about 85 TSU and more specifically between about 70 TSU and about 80 TSU.

A tape according to the invention with a proportion of filaments taken in the polymeric matrix of less than 100% has the remarkable particularity of not breaking when the latter is folded on itself, unlike the tapes obtained by standard impregnation in a liquid phase. Without intending to be bound to theory, it is believed that a proportion of filaments, notably of carbon, which are not set in the matrix, may slide on each other during the deformation of the tape. The tape according to the invention having a proportion of filaments taken in the polymeric matrix of less than 100%, preferably less than or equal to 99, 98, 97, 96, 95 or 90%, does not break during folding, which is not the case of tapes obtained by standard impregnation which may break when they are folded on themselves. The result of this is that the tapes according to the invention have an unparalleled folding capability, with a very reduced radius of curvature.

The object of the invention is also a facility giving the possibility of applying the method according to the invention and producing a tape according to the invention. This facility notably comprises the following elements.

a) At least one coil-holder pin with a brake.

b) A device for unwinding and/or aligning the thread in the machine axis; alternatively, if one has a strand supply coil without any winding, the device is a device for aligning the thread in the machine axis; the device may for example include a set of two bars at 90°, a first bar parallel to the axis of the coil, oriented at about 90° relatively to the running direction of the strand leaving the coil, and a second bar located below the first, oriented at about 90° relatively to the previous one and perpendicularly to the machine axis, as described above.

c) optionally a transverse device for spreading out the strand, notably a bar device operating on the principle of applying a tension on the strand causing transverse spreading of the filaments, notably of the type including at least 1, preferably several (typically from 2 to 7) bars perpendicular to the machine axis and including at least 1 which is located above or below this machine axis (which gives the possibility of imposing a tension to the strand, causing its opening); the bars may notably have a diameter comprised between about 10 mm and about 100 mm; preferably they have a not very abrasive surface, for example in chromium, aluminium or ceramic; they may be heated and/or be vibrated; they may have a regular cylindrical, oval or elliptical shape or with a non-constant section, they may be rectilinear or bent, they may be braked or not.

d) A device for calibration in width, giving the possibility of handling or adjusting the length of the strand. This device may notably comprise a part provided with a groove for bringing back the filaments of the strand to the width of the groove. The width of the groove may be advantageously determined by the width of the tape to be produced, for example, the calibration width (or of the groove) is from 1.5 to 4.5, notably from 2 to 3 times the rated width of the final tape.

e) Optionally a device for pinching or pulling the strand, preferably including two rollers, at least one of which is driven into rotation, for example by a foulard or a similar device, giving the possibility of pinching the strand in order to maintain its width and to apply to the strand a movement for advancing towards the storage coil; the foulard or similar device may notably include at least two rollers positioned above each other, at least one of them may be displaced towards the other in order to apply a pressure to a material, in this case the strand, which would pass between them, and at least one of which is driven into rotation.

f) Optionally a device for measuring the width of the strand, notably a laser, as described above.

g) At least one metal part (preferably in a good electricity conductive metal and with a non-abrasive surface) grounded. This metal part may advantageously be placed as close as possible to the powder coating device which will be described. This may be one or several (typically 2) metal bars.

h) At least one electrostatic powdering device or electrostatic powder coating device. Preferably the powdering device includes a fluidizer or a dry fluidization device with a chamber for storing powder maintained in the fluidized condition. Preferably, it includes a powdering chamber in which are positioned one or several guns or nozzles for electrostatic powdering using the principle of a corona discharge. The guns or nozzles are connected to the chamber for storing powder fluidized by tubes. Preferably, the powder coating device comprises a central control unit for the gun(s), giving the possibility of notably adjusting the injection pressure, the dilution pressure, the tension and the dissipated intensity at the cathode. Details of the operation are given above.

i) Optionally a system for dividing the carbon tape into several bundles of filaments under the powder coating device. This system for dividing the initial tape may be accomplished by using a comb or any other grooved element (for example a bar, the surface of which has streaks or grooves extending on the circumference of the bar) giving the possibility of separating the filaments in a regular way (examples of number of bundles above, and therefore of grooves or the like). The goal is to deposit the powder at the core of the strand in order to increase the impregnation level.

The use of this division device makes it preferable that the first powdering gun be placed vertically or in the vicinity of the tape separated into bundles, therefore vertically or in the vicinity of the separation device or immediately downstream, and that the second is found further on downstream in the powder coating device, at a location where the bundles are brought closer to each other, this second gun giving the possibility of cladding the tape. The specific location within the powder coating device may be easily determined.

j) At least one heating unit such as an oven. Preferably one short or medium infrared oven(s) are used. The regulation of the oven(s) is preferably accomplished in power. Their power is adapted to the applied polymer.

k) Optionally, a device for aligning the tape for having it coincide with the machine axis and in particular with the calibrator which will be described. It is thus possible to use one or several bars, notably oblique bars.

l) Optionally, a calender, preferably the calender is cooled. The pressure applied by the calender is preferably adjustable.

m) A calibration device in the transverse direction and in thickness, it may notably comprise at least two calibration forms, notably grooves, antagonistic grooves, i.e. one of the forms will act upon contact with a first face of the strand, the other one in contact with the other face of the tape. The width of the forms is advantageously adjusted to the desired rated width for the tape. In an embodiment, a first groove is flared at the beginning, but has a rated width equal to the desired rated width for the final tape, for example 6.35 mm. This groove is in contact with the lower or upper face of the tape. A second groove is in contact with the other face of the tape, it also has a rated width equal to the desired rated width for the final tape, for example 6.35 mm. This groove may for example be machined on a roulette wheel. Both grooves have to be perfectly aligned and may for example be mounted on verniers which allow a very accurate adjustment of their position, relatively to each other but also relatively to the running of the tape. Different embodiments will be described in the examples.

n) Optionally, a device for measuring the width of the tape, notably a laser, as described above and in the examples. This measurement device may preferably be connected to a computer or program processor for adjusting the measurement rate (for example every x cm, e.g. every 50 cm or every 1 meter), recording the measured values all along the production of a tape coil and/or calculate the standard deviation.

o) At least one storage coil-holder pin, preferably this pin is shifted relatively to the machine axis in the direction of the height, for example by one or several (typically 2) return bars. This pin may be part of a conventional winding device, giving the possibility of winding in a crossed way or thread to thread, for example. The pin may notably be servocontrolled in velocity or in tension.

According to a preferred feature, the elements b), c), d), e), g), h), i), j), k) and l), also preferably n), are aligned on the machine axis so that the strand, and then the tape does not undergo any sensitive lateral displacement movement. Still preferably, the elements e), g), h), i), j), and k), also preferably d) are perfectly aligned on the machine axis, so that the strand, and then the tape does not undergo any lateral displacement movement or a sensitive movement in height. The bar spreading device c) as for it is preferably positioned so that the inlet and the outlet of the strand is accomplished by being perfectly aligned on the machine axis, laterally and also preferably in height.

Driving devices are provided. They comprise devices for driving into rotation the pin of the device for winding the formed tape. They also comprise the foulard or similar in e).

These driving devices may advantageously be servocontrolled, giving the possibility of handling the tension of the strand and then of the tape, all along the production line.

The facility may comprise several production lines giving the possibility of producing simultaneously several tapes from several strands.

The invention also relates to the parts or composite articles manufactured from a tape according to the invention or produced according to the method of the invention. These parts or articles are formed totally or partly with the tape, the piece or the article having been consolidated under hot conditions, for example in an autoclave or in an oven, after placing the tape so as to form the blank. In an embodiment, the part or article is exclusively or mainly formed with the tape according to the invention or produced according to the method of the invention.

The invention also relates to the use of a tape according to the invention for the manufacturing of an article or composite part, and such a manufacturing method, comprising the placement of the tape in order to form a blank, and then the consolidation of the part or article under hot conditions, notably in an autoclave or in an oven. The tape may be placed edge to edge and/or superposed, the superposition may be accomplished according to adapted angle (s). The placement may be achieved by automated fiber placement (AFP: Automated Fiber Placement) or by filament winding, pultrusion, braiding, 3D printing. The placement may be accomplished on a support or a mold.

The invention will now be described in more detail by means of embodiments taken as a non-limiting example and with reference to the drawing wherein.

Figure 1:
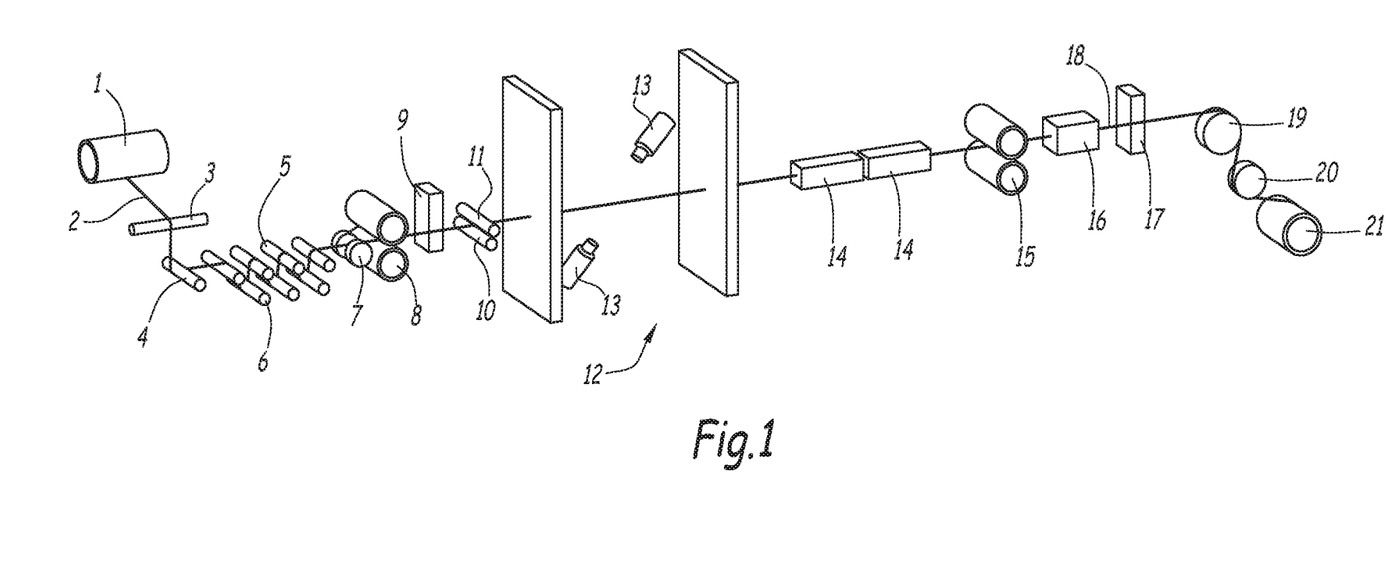
FIG. 1 is a schematic illustration of a facility according to the invention.

The numerical mark 1 refers to a strand coil 2, for example the carbon filament strand. This coil is mounted on a pin (not shown), provided with an adjustable brake. A first bar 3 is parallel to the axis of the coil 1 and oriented at 90° relatively to the running direction of the strand 2, the latter sliding from left to right on the first bar because of the winding effect of the supply coil 2. Subsequently, a second bar 4 is located underneath the first, oriented at 90° relatively to the previous one and perpendicularly to the machine axis. A series of seven spreading bars is illustrated. Four of them referenced as 5 are positioned so that the strand is tangent to their upper portion, the three other referenced as 6 being placed beneath the machine axis and bringing the strand to be tangent with their lower portion by applying to it a stress such that the strand is spread out in width. A calibration device 7 has a groove in which passes the strand, which is calibrated therein to the desired width. A foulard 8 is positioned sequentially to it, this foulard being designed for pinching the strand 2 and forcing it to move in the direction opposite to the supply coil. A Laser device for measuring the width of the strand is illustrated as 9. Two metal bars 10 and 11 connected to the ground are in contact for one, 10 with the lower face of the strand, for the other one, 11 with the upper face. These bars apply a certain pressure on the strand.

In 12, an electrostatic powdering unit is illustrated comprising two powdering guns 13, supplied with fluidized polymer powder stemming from a fluidization device not shown. One of the guns has its spraying nozzle oriented towards a face of the strand, the other one towards the other face of the strand. The unit is controllable in order to ensure the continuous deposition of a determined amount of thermoplastic or thermosetting material on the strand 2 which runs inside the enclosure.

The numerical mark 14 designates both infra-red ovens, preferably either short or medium, located one behind the other, which are controlled in temperature and this control is made for power. The impregnated strand with molten polymer then passes into a cooled calender 15. The calender includes two rollers and a device for adjusting the pressure exerted by the rollers on the strand which passes between them. The strand then passes into a calibration device 16, examples of which will be described with reference to FIGS. 2-4. A Laser device for measuring the width of the tape is illustrated as 17, it is connected to a computer or processor allowing the recording of the width and the calculation of the standard deviation. The device carries out one/off measurements, at regular intervals, according to the will of the user. At the stage of the passage in front of the Laser device, the strictly speaking tape 18 is formed. The tape is then managed by a device for winding a tape, comprising two idlers 19 and 20 and a storage coil 21 mounted on a pin (not shown) driven into rotation.

According to a significant feature, the active surfaces (in contact with the strand or the tape) of the elements 4, 5, 7, 8, 14, 15, and 16 are perfectly aligned on the machine axis, so that the strand, and then the tape when it is formed, does not undergo any lateral or sensitive height movement.

Figure 2:
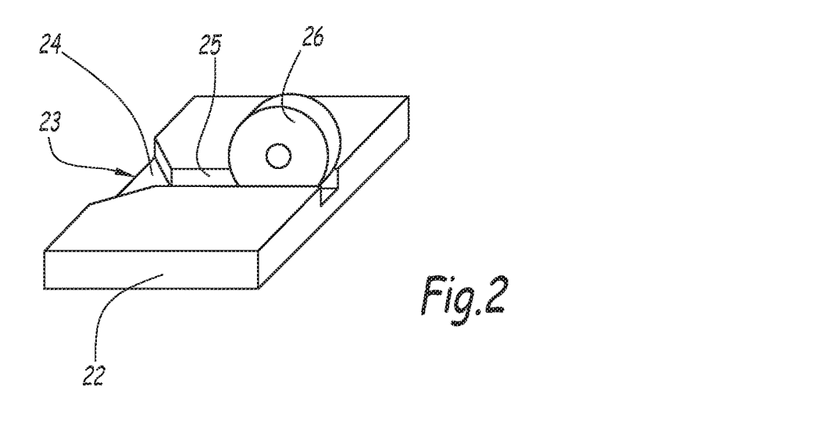
FIGS. 2, 3 and 4 are schematic illustrations of different calibration devices according to the invention.

In FIG. 2, a first embodiment is illustrated of a calibration device which may be used, notably as a device 16 in the facility of FIG. 1. It comprises a plate 22 dug with a groove 23 formed of a flared portion 24 and of a rectilinear portion 25. The width of the groove is equal to the width of the tape to be produced. The numerical mark 26 designates a roulette having a planar axisymmetrical surface with a width slightly less than that of the rectilinear portion 25 of the groove in which it will be inserted in part. During operation, it is understood that the strand passes at the bottom of the groove 23 and that the roulette will apply a pressure on it inside the portion 25 of the groove 23. A device (not shown), for example a vernier, gives the possibility of carrying out this operation. This gives the possibility of adjusting the pressure exerted on the strand.

Figure 3:
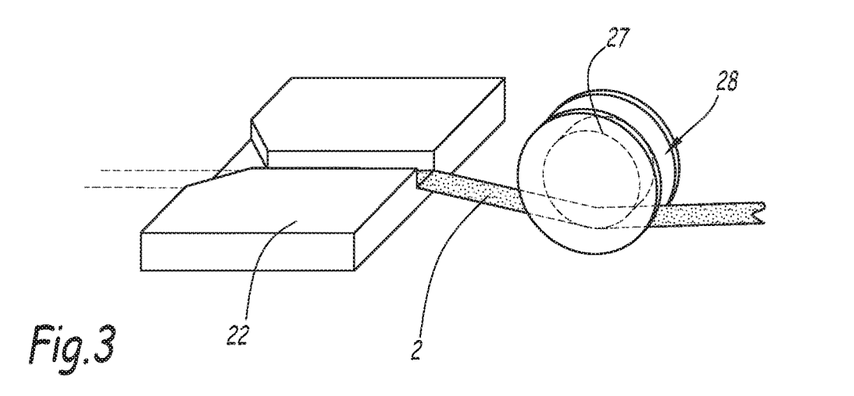

In FIG. 3, the same plate 22 is again found. At the place of the roulette 26, downstream from the plate, a roulette 27 is positioned including a peripheral groove 28 with a flat bottom, the width of which is equal to the width of the tape to be produced. When operating, it is understood that the strand 2 passes at the bottom of the groove 23, and then in the groove 28 of the roulette 27, which will apply a pressure on it. A device, for example a vernier, not shown, gives the possibility of positioning the flat bottom of the groove in height relatively to the machine axis in order to adjust the pressure exerted on the strand.

Figure 4:
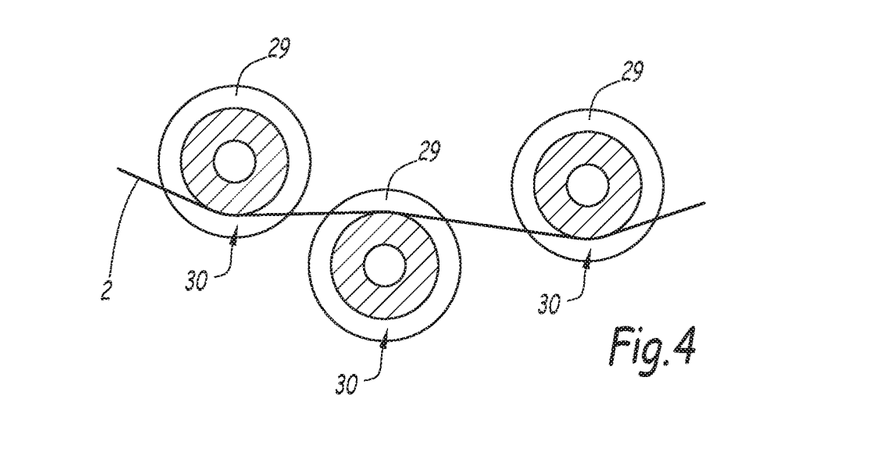

In FIG. 4, a succession of three roulettes 29 are used each including a peripheral groove 30 with a flat bottom, the width of which is equal to the width of the tape to be produced. The first and third roulettes are placed above the machine axis, the second one below. When operating, it is understood that the strand 2 passes into contact with the bottoms of the groove 30, at the lower portion of the first roulette, and then at the upper portion of the second roulette, finally at the lower portion of the third roulette. A device, for example a vernier, not shown, gives the possibility of positioning the flat bottom of the grooves in height relatively to the machine axis in order to adjust the pressure exerted on the strand.

EXAMPLE 1: OBTAINING A CARBON/PEEK TAPE WITH A MASS POLYMER LEVEL OF 34% AND WITH A WIDTH OF 6.35 MM BY USING THE FACILITY OF FIG. 1

One starts with a flat strand of carbon filaments HR HTS45 E23 from Toho Tenax, a titer comprised between 810 tex and 780 tex, the strand width varying between 3 and 7 mm, wound and crossed.

A PEEK 150PB powder from Victrex, grain size $d_{10}=30$ μm, $d_{50}=60$ μm, $d_{90}=100$ μm.

The strand of carbon fiber is heated and then spreaded out to a width comprised between 8 mm and 12 mm by bar spreading, under a tension after bar spreading comprised between 4.5 kg and 2.5 kg. The fibers then pass into a groove with a width of 10 mm, and then in the foulard which gives the possibility of pulling the fiber. Before entering the powdering cabin, the fiber passes into the contact of two bars connected to ground.

The powdering coating step is carried out by means of an SAMES facility comprising a fluidization pan, 2 guns and a controlled central unit. In order to obtain the targeted powder level, a single gun is used, its adjustments are shown in the following table:

| Parameter | Adjustment |
| --- | --- |
| Voltage (kV) | 70 |
| Intensity (μA) | 70 |
| Injection pressure | 12 |
| Dilution pressure | 5 |

The pressure of the fluidization pan is adjusted to 2 bars, which gives the possibility of having a homogeneous and regular fluidization conditions.

Next, the melting of the polymer is carried out by having the tape pass between two infrared radians rollers with a tape (average IR) SOPARA, adjusted between 50% and 70% of their power. These are IR tape radians of the brand SOPARA with a length of 75 cm and each with a power of 2.3 kW.

The calibration is carried out by calendering in a first phase the tape, and then having it pass into a groove with a rated width of 6.35 mm+/−0.05 mm.

Figure 8:
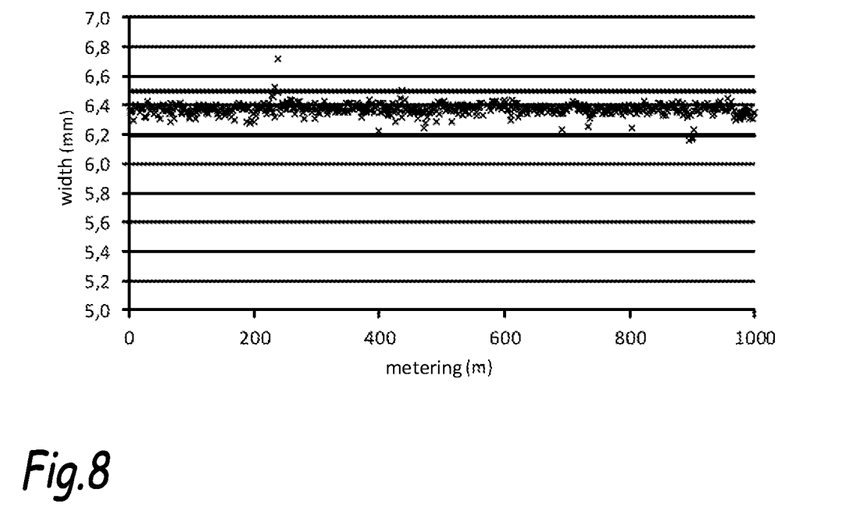
FIGS. 8 and 9 are graphs representing the width measurements carried out every 1 m of tape according to the metering in m produced.

The measurement of the width is carried out with a LASER Mike Model 911 (measurement accuracy of 0.003 m), the data collected every 1 m during the production of a coil of 1,000 m are illustrated in FIG. 8.

The average width of the tape is 6.37 mm with a standard deviation of 0.04 mm.

The winding is carried out in tension, at a value comprised between 15 m/min and 20 m/min with a winding device SAHM.

Figure 6:
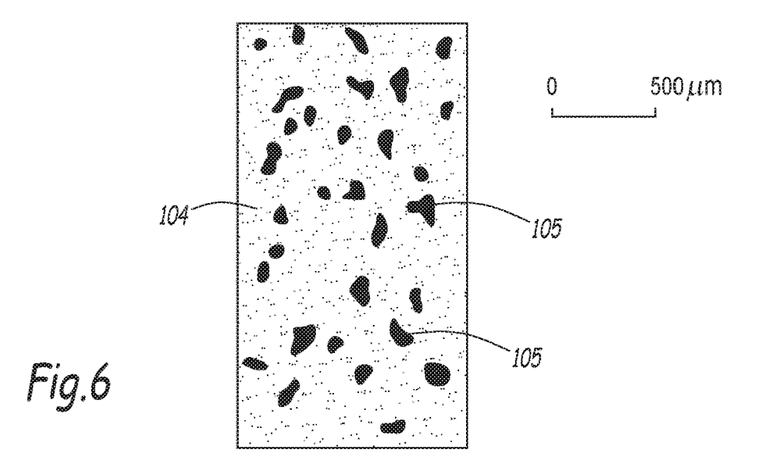
FIG. 6 is a schematic illustration of a tape produced by a first embodiment of the invention.

FIG. 6 is a schematic view of the surface of the tapes observed with a binocular magnifying glass with a magnification of 0.6×3. The numerical mark 104 designates the polymer coating, relatively continuous, and only shows the carbon filaments on discrete areas designated by the numerical marks 105.

EXAMPLE 2: OBTAINING A CARBON/PEEK TAPE WITH A MASS POLYMER LEVEL OF 34% AND A WIDTH OF 6.35 MM BY USING THE FACILITY OF FIG. 1

One starts with a round strand of carbon filaments HM M46JB 12K 50B from Toray, a titer of 445 tex, a strand width varying between 2 and 5 mm, wound and crossed.

PEEK powder 150PB from Victrex, grain size $d_{10}=30$ μm, $d_{50}=60$ μm, $d_{90}=100$ μm.

The strand of carbon fiber is heated in order to spread it out at a width comprised between 5 mm and 8 mm by bar spreading, under a tension after bar spreading comprised between 4.5 kg and 2.5 kg. The fibers then pass into a groove with a width of 8 mm, and then into the foulard which gives the possibility of pulling the fiber. Before entering the powdering cabin, the fiber passes into the contact of two bars connected to ground.

The powdering coating step is carried out like in Example 1. The pressure of the fluidization pan is adjusted to 2 bars, which gives the possibility of having a homogeneous and regular fluidization conditions. Next, the melting of the polymer is carried out by having the tape pass under two infrared radians with a lamp SOPARA (length of 75 cm and each with a power of 3 kW), adjusted between 50% and 70% of their power.

The calibration is carried out by calendering in a first phase of the tape, and then by having it pass into a groove with a rated width of 6.35 mm+/−0.05 mm.

Figure 9:
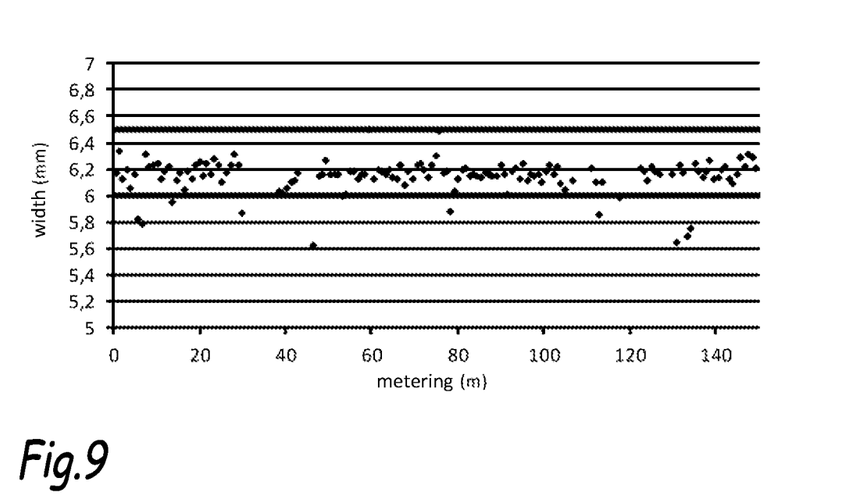

The measurement of the width is carried out with the LASER Mike, like in Example 1, the collected data every 1 m during the production of a coil of 150 m are illustrated in FIG. 9.

The average width is 6.16 mm with a standard deviation of 0.13 mm.

The winding is carried out in tension, at a velocity comprised between 5 m/min and 20 m/min with a winding device SAHM.

Figure 7:
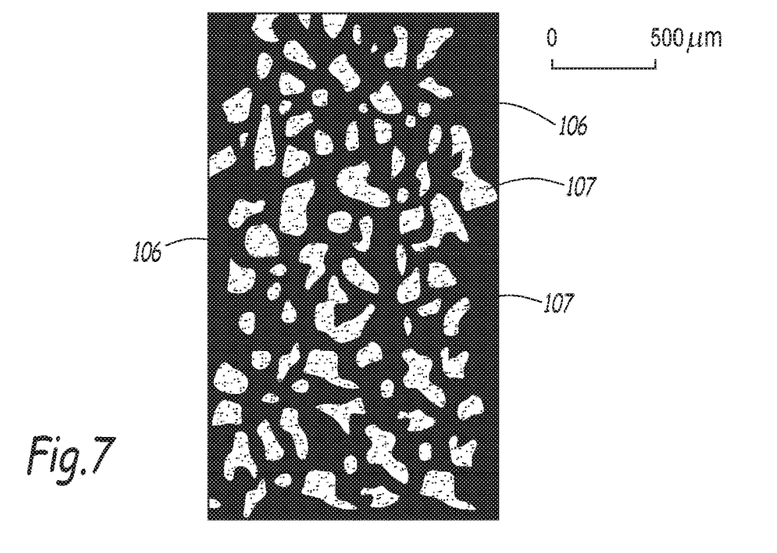
FIG. 7 is a schematic illustration of a tape produced by a second embodiment of the invention.

FIG. 7 is a schematic view of the surface of the tapes observed with a binocular magnifying glass with a magnification of 0.6×3. The numerical mark 106 designates the carbon filaments and this time, the polymer having remained at the surface does not form a quasi continuous coating, but discrete areas 107.

Figure 5:
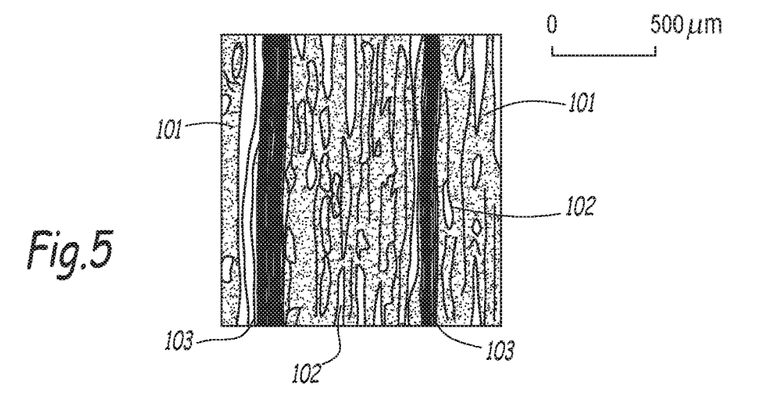
FIG. 5 is a schematic illustration of a tape produced by the standard method with impregnation in a bath.

By comparison with FIGS. 6 and 7, FIG. 5 shows what one obtains with the standard impregnation method by immersion in a bath. The numerical mark 101 designates continuous areas of polymer at the surface, the mark 102 designates discrete clusters of polymer and the mark 103 designates naked filaments.

EXAMPLE 3: PRODUCTION OF A COMPOSITE ARTICLE

An automated fiber placement automaton (AFP) is programmed for depositing the tape according to Example 1 or according to Example 2 on a support, until the blank of the part to be manufactured is formed. The automaton places the tape edge to edge in order to thereby form a fold, and then superpose another fold on the preceding one, the superposition being able to be accomplished according to adapted angle(s) according to the production program for the blank. The formed blank is then placed according to a first sub-example in an oven and according to a second sub-example in an autoclave. The consolidation is conducted to its end and the consolidated composite part is obtained.

Composite parts were formed successfully with the tape according to Example 1.

EXAMPLE 4: PRODUCTION OF A TAPE WITH BUNDLES OF FILAMENTS

Figure 10:
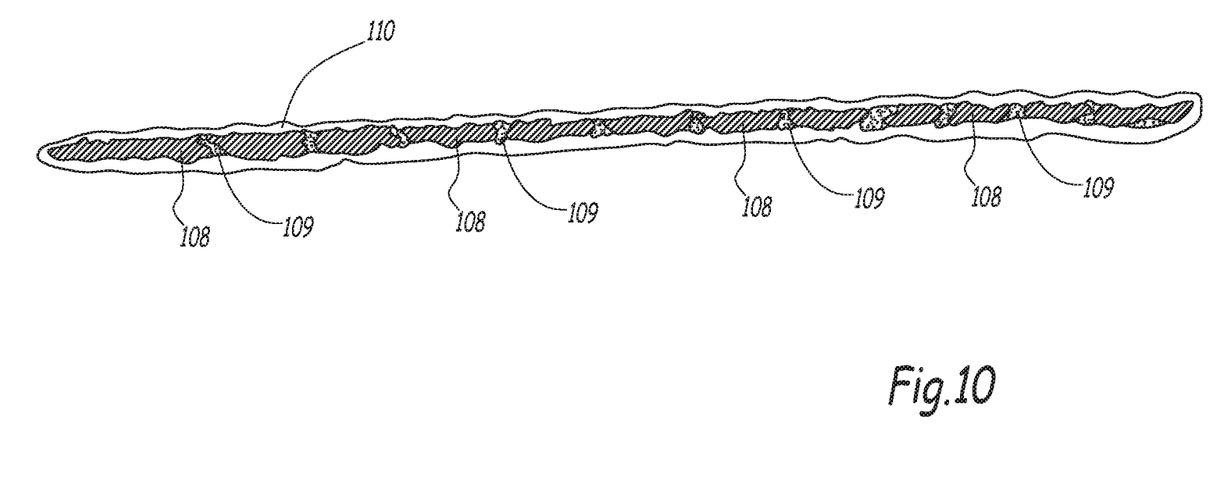
FIG. 10 is a schematic illustration of a cross-section of a tape including bundles of filaments.

In the powdering device 12, a bar with circumferential grooves is installed, the grooves having a width which depends on the targeted width of the bundles; typically, this width may be comprised between about 0.25 and about 2 mm. The tape is brought into contact with this bar, in a permanent or intermittent way, in order to ensure the separation of the strand into bundles. The first powdering gun projects the powder on the strand separated into bundles, notably immediately downstream from the bar. The second gun is positioned a little downstream, notably a few centimeters further on, in a location where the bundles are brought closer to each other. The impregnated product stemming from this application, schematically visible in FIG. 10, is characterized by a distribution of the filaments as bundles 108 with a width comprised between 200 µm and 6,000 µm and a height comprised between 50 µm and 250 µm for which the spacing (polymer area 109) is comprised between 25 µm and 100 µm. Further, this product retains a thin sheath 110 of polymer with a thickness comprised between 25 µm and 100 µm. This product has good cohesion in the direction transverse to the filaments. Its surface condition may be similar to the one observed with the hollow product.

The invention claimed is:

1. A method for manufacturing a tape from reinforcement filaments impregnated with a thermoplastic polymer matrix, a tape which has a constant width over the whole of its length, wherein the filaments extend along a direction parallel to the length of the tape, from a strand of filaments stemming from a supply coil, the method comprising, from a coil for supplying strand up to a coil for storing the impregnated and consolidated tape:
   a) managing the tension between the supply coil and the storage coil,
   b) guiding the strand so as to obtain a strand moving in translation over a line coinciding with a longitudinal axis, a so called machine axis, extending as far as the proximity of the storage coil,
   c) transverse spreading of the strand to a predetermined width greater than the rated width of the tape,
   d) managing the width of the strand to a predetermined value comprised between the maximum spreading out width and the rated width of the final tape,
   e) pulling the strand and maintaining the strand width,
   f) grounding the strand,
   g) deposition of the polymer as a powder on the strand, by electrostatic powder coating, with a mass polymer level of greater than 25% and up to about 75%, obtaining an impregnated tape,
   h) melting or softening the polymer,
   i) calendering and calibration in width and in thickness of the tape,
   j) optionally measuring the width of the tape, and
   k) winding the tape on the storage coil.

2. The method according to claim 1, wherein the electrostatic powder coating is carried out with a polymer powder maintained as a fluidized bed, and then deposited by means of one or several electrostatic powdering guns.

3. The method according to claim 1, wherein in h), the tape is calendered and then calibrated transversely.

4. The method according to claim 3, wherein calibration is performed both in the transverse direction and in thickness.

5. The method of claim 3, wherein the calendering at i) is carried out at a temperature comprised between the glassy transition temperature and the melting point of the semi-crystalline polymer.

6. The method according to claim 1, wherein calendering is carried out with a cooled calender.

7. The method according to claim 1, wherein the calibration is performed by means of at least two antagonistic grooves or with at least one groove and an antagonistic planar surface.

8. The method according to claim 1, wherein calibration is performed to the desired rated width for the tape.

9. The method according to claim 1, wherein the transverse spreading c) of the strand is carried out and it is carried out to a predetermined width greater than the rated width of the tape, by spreading out of the strand, and then the strand is calibrated to a predetermined value.

10. The method of claim 9, wherein the width value is of 1.5 to 4.5 the rated width of the final tape.

11. The method of claim 1, wherein calendering pressure is greater than or equal to 1 bar.

12. The method of claim 1, wherein calendering pressure is between about 1 and about 4 bars.

13. The method of claim 1, wherein calendering pressure is less than 1 bar.

14. The method of claim 1, wherein calendering pressure is between about 0.1 and about 0.9 bar.

15. The method of claim 1, wherein the running rate of the strand and of the tape comprises between about 5 and about 50 m/min.

16. The method of claim 1, wherein upstream from the melting, an alignment of the tape is made in order to have the tape coincide with the machine axis.

17. The method of claim 1, wherein the thermoplastic polymer is a thermoplastic polymer having a melting point or a transformation temperature greater than or equal to 280° C.

18. The method of claim 17, wherein said polymer is polyetheretherketone (PEEK), polyetherketoneketone (PEKK), poly(phenylene sulfide) (PPS), or polyetherimide (PEI).

19. The method of claim 1, wherein winding the tape at k) is made with tension control.

20. The method of claim 1, wherein a tape is made from a single strand or a plurality of strands.

21. The method of claim 1, wherein the reinforcement filaments are in carbon.

22. The method of claim 21, wherein two carbon strands are superposed before powder coating or after powdering coating when the polymer is molten or soften.

23. The method of claim 1, wherein the mass polymer level is of about 30% to about 75%.

24. The method of claim 1, wherein pulling the strand at e) is carried out by pinching or with a foulard.

* * * * *